United States Patent
Hawes, IV et al.

(10) Patent No.: US 11,760,420 B1
(45) Date of Patent: Sep. 19, 2023

(54) UNIVERSAL MOUNTS FOR CANOPIES TO ROLLOVER PROTECTION BARS OF VARIED ATTITUDES

(71) Applicant: Accu-Form Polymers, Inc., Warsaw, NC (US)

(72) Inventors: George Aubrey Hawes, IV, Garner, NC (US); Patrick Renfro, Warsaw, NC (US)

(73) Assignee: Accuform Polymers, Inc., Warsaw, NC (US)

( * ) Notice: Subject to any disclaimer, the term of this patent is extended or adjusted under 35 U.S.C. 154(b) by 118 days.

(21) Appl. No.: 17/506,028

(22) Filed: Oct. 20, 2021

Related U.S. Application Data

(60) Provisional application No. 63/140,053, filed on Jan. 21, 2021.

(51) Int. Cl.
| | | |
|---|---|---|
| *B62D 25/06* | (2006.01) | |
| *B60R 21/13* | (2006.01) | |
| *B62D 33/06* | (2006.01) | |

(52) U.S. Cl.
CPC ............ *B62D 25/06* (2013.01); *B60R 21/131* (2013.01); *B62D 33/0621* (2013.01)

(58) Field of Classification Search
CPC ................ B62D 25/06; B62D 33/0621; B62D 33/0617; B60R 21/131; B60R 21/13
USPC .......................................... 280/756; 296/102
See application file for complete search history.

(56) References Cited

U.S. PATENT DOCUMENTS

| | | |
|---|---|---|
| 5,882,063 A | 3/1999 | Job |
| 7,152,903 B2 | 12/2006 | Westendorf et al. |
| 7,182,399 B2 | 2/2007 | Kamerer |
| 7,641,234 B1 | 1/2010 | Pelnar |
| 10,053,158 B1 | 8/2018 | Renfro et al. |
| 2005/0073169 A1 | 4/2005 | Kamerer |
| 2005/0168007 A1 | 8/2005 | Westendorf et al. |
| 2015/0076855 A1 | 3/2015 | Vogt |
| 2016/0214653 A1 | 7/2016 | Cook |
| 2017/0267081 A1 | 9/2017 | Cook |

FOREIGN PATENT DOCUMENTS

CN 105686877 * 3/2018

* cited by examiner

*Primary Examiner* — Dennis H Pedder
(74) *Attorney, Agent, or Firm* — MacCord Mason PLLC

(57) ABSTRACT

A universal mount for installing a canopy onto work vehicle ROPS (roll bars) that have left and right downward extensions and a bridging element between the left and right downward extensions. A clamp secures the universal mount onto a ROPS, and a crossbar attached to the clamp extends parallel to the bridging element. The crossbar has plates on each opposed end. Each crossbar plate has at least one slot adapted to receive a fastener. Offset plates can be mounted to a peripheral frame of a canopy. The universal mount can be clamped to a ROPS. The canopy fastens to the crossbar by aligning holes on the offset plates affixed to the canopy with the slots in the crossbar plates, passing fasteners through the aligned hole and slot, adjusting the canopy attitude to a desired orientation by positioning fasteners at a selected position in the slots.

18 Claims, 4 Drawing Sheets

UNIVERSAL MOUNTS FOR CANOPIES TO ROLLOVER PROTECTION BARS OF VARIED ATTITUDES

BACKGROUND OF THE INVENTION

The present invention relates to a universal canopy and mount for roll over protection bars for work vehicles (including mowers and tractors). Work vehicles often include a roll over protection system (ROPS) for protecting drivers in case the vehicle turns over. Typically, the ROPS comprises roll bars attached to the vehicle that prevents a person in the vehicle from being crushed by the vehicle if it overturns. Many variations of ROPS exist and may depend on the vehicle and manufacturer. For example, ROPS may be a fixed structure or may be foldable for storing or operating in low clearance areas. Some vehicles may have an integrated ROPS, while others (particularly older vehicles) may require installation of roll bars that are sold separately. ROPS may also vary in the number of roll bars and the angle of the roll bars with respect to the vehicle.

The structure of ROPS provides a suitable location for installing a canopy. However, because of the various ROPS available, the connection between the ROPS and the canopy is dependent on the particular model of the ROPS. Installing a canopy intended for one ROPS model on another model type may lead to a less than desirable configuration, such as a slanted canopy. Applicant addressed this need with the subject matter disclosed in U.S. Pat. No. 10,053,158, the entire disclosure of which is incorporated herein by reference. However, there are further variations in ROPS that call for further flexibility. For example, FIG. 1 shows a work vehicle 16 with a ROPS that is of rectangular cross section and that has a bridging element 20 that is mounted so that it has vertical sides and a flat, horizontal top. FIG. 2 shows a similar work vehicle, but the ROPS of that work vehicle is tilted forward, so its bridging element 120 has two sloping upper sides. Thus, there remains a need for a universal mount for installing canopies independent of the work vehicle's ROPS.

SUMMARY OF THE INVENTION

The present invention fulfills one or more of these needs in the art by providing a universal canopy for work vehicle ROPS (roll bars) that have left and right downward extensions and a bridging element between the left and right downward extensions. A ROPS mount includes a clamp to clamp to a ROPS, a crossbar attached to the clamp to extend laterally across the ROPS toward the left and right downward ROPS extensions, and plates on each opposed end of the crossbar. The plates in the crossbar have arcuate cutouts. A canopy has left and right depending peripheral flanges, and the flanges have a plurality of holes arrayed in a fore-and-aft orientation. Offset plates are affixed to selected holes in the peripheral flanges in the canopy. The ROPS mount can be clamped to a ROPS and the canopy can be bolted to the ROPS mount by passing bolts through holes in the offset plates and one of the arcuate cutouts, and the canopy attitude can be adjusted to a desired orientation by positioning bolts at a selected position in the arcuate cutouts. Desirably, the arcuate cutouts in the plates in the crossbar subtend about 90 degrees. A friction sheet can be included, placed between the crossbar plates and the offset plates.

The canopy may be formed of thermoformed plastic. The canopy may include a coextruded acrylic layer coated on the canopy. The acrylic layer may be an acrylic film.

The clamp may include a ROPS clamp element with a channel to mate with a ROPS and flanges, as well as a crossbar clamp element with a channel to mate with the crossbar. Both the ROPS clamp element and crossbar clamp element may have flanges that can be positioned facing one another and held together to clamp the crossbar to the ROPS.

The selected holes in the peripheral flanges of the canopy may be located on an interior frame affixed to the canopy.

The invention may also be considered as a method for installing a canopy onto work vehicle ROPS (roll bars) that have left and right downward extensions and a bridging element between the left and right downward extensions. The method may include clamping a mount having a crossbar with plates at opposing ends to the bridging element, affixing offset plates to a frame of a canopy, aligning holes in each offset plate with a slot in one of the crossbar plates, passing bolts through the aligned holes and slots, adjusting the angle of the canopy by positioning the bolts along the slots, and securing the canopy at the angle by tightening the bolts with nuts.

The invention may also be considered as a kit for installing a canopy onto a work vehicle ROPS (rollbars). The kit includes a crossbar adapted to be positioned parallel to a bridging element of a ROPS, a clamp having a ROPS clamp element with a channel to mate with the ROPS, and a crossbar clamp element with a channel to mate with the crossbar. Both the ROPS clamp element and crossbar clamp element have flanges that can be positioned facing one another and held together to clamp the crossbar to the ROPS. Plates are on each opposed end of the crossbar, each plate having at least one slot adapted to receive a fastener. A canopy has left and right depending peripheral flanges that have a plurality of holes spaced apart in a fore-and-aft orientation. Offset plates have holes to permit affixation of the offset plate to the holes in the peripheral flanges of the canopy. The slots on the crossbar plate may subtend about 90 degrees.

BRIEF DESCRIPTION OF THE DRAWINGS

The invention will be better understood by a reading of the Detailed Description of the Examples of the Invention along with a review of the drawings, in which.

DETAILED DESCRIPTION OF EXAMPLES OF THE INVENTION

Figure 1:
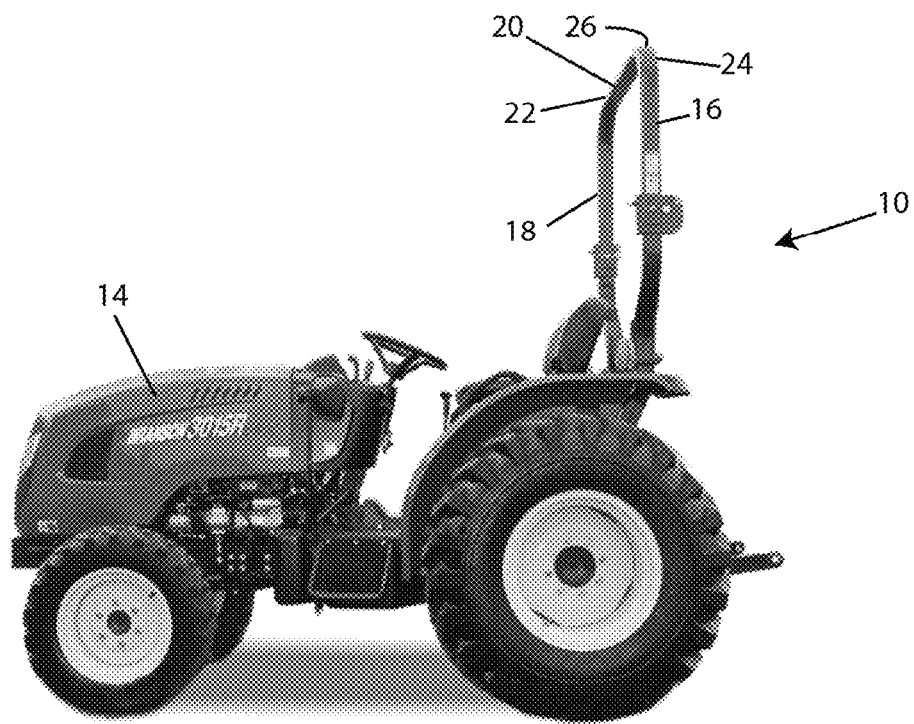
FIG. 1 is a side view of a prior art work vehicle with a ROPS that is of rectangular cross section and that has a bridging element that is mounted so that it has vertical sides and a flat, horizontal top.
Figure 2:
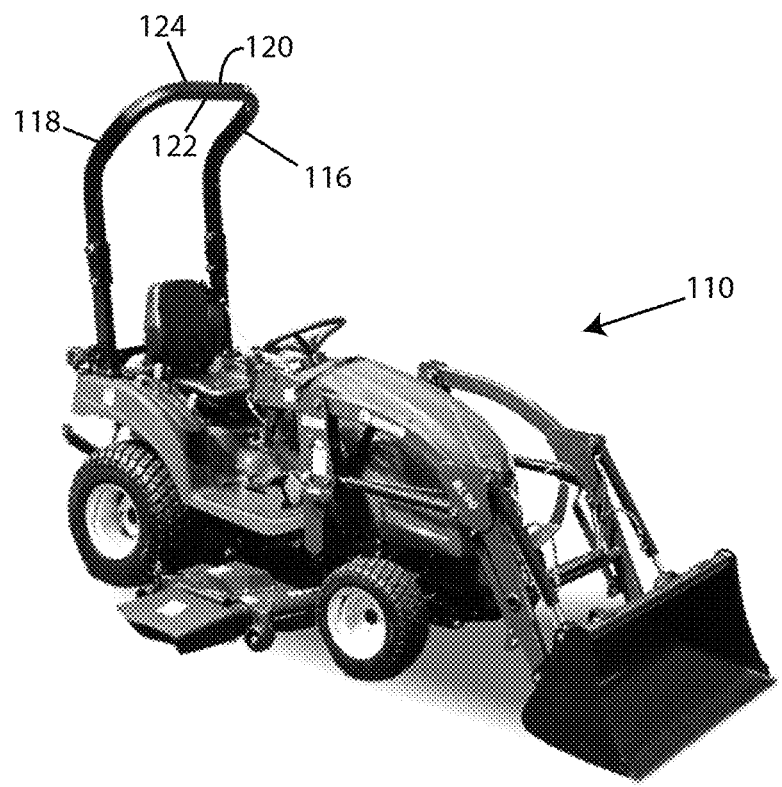
FIG. 2 shows a perspective view of prior art work vehicle with a ROPS that is tilted forward, so its bridging element has two sloping upper sides.

FIG. 1 shows one embodiment of a ROPS on a work vehicle, generally designated 10. Work vehicle 14 includes a roll over protection system (ROPS) comprising a vertical left downward extension 16 and a vertical right downward extension 18 with a bridging element 20 extending between the extension 16 and the extension 18. The bridging element 20 is generally rectangular in cross section, so it has vertical sides 22 and 24 and a flat, horizontal top 26. FIG. 2 shows a work vehicle 110 with a ROPS having tilted downward extension 116 and 118. Work vehicle 110 has a bridging element 120 that is generally rectangular in cross section, but the tilts of the downward extensions 116 and 118 cause the bridging element 120 to have tilted upper surfaces 122 and 124.

Figure 3:
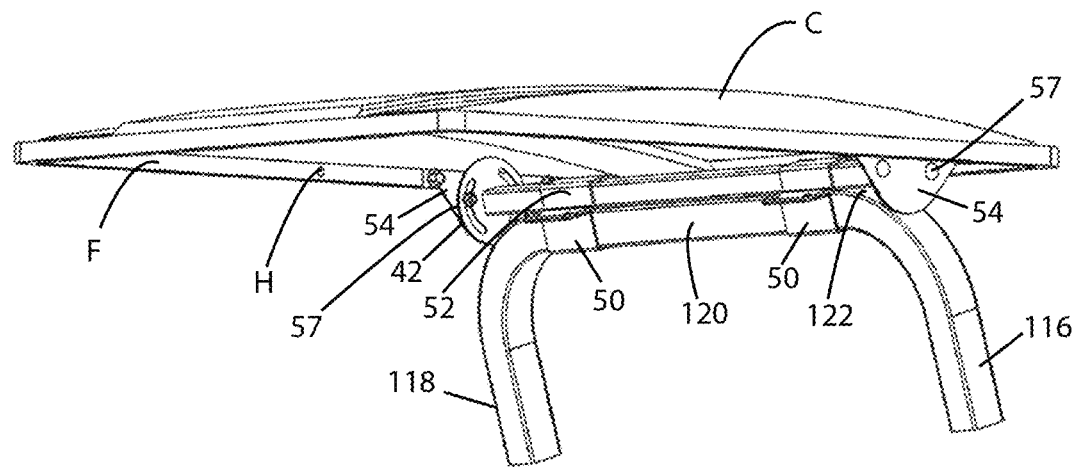
FIG. 3 is perspective view of the top of the ROPS of a work vehicle with a ROPS that is tilted forward and has a canopy mounted thereon according to one embodiment.

FIG. 3 shows a canopy C installed onto bridging element 120 via mounting system 70. Canopy C is thermoformed of a plastic that is preferably acrylonitrile butadiene styrene (ABS) plastic coated with an acrylic layer for weatherability. See www.accuform-polymers.com/thermoforming.html. ABS is a common thermoplastic polymer known for its lightness, stiffness, impact resistance and toughness. In one embodiment, the acrylic layer may be Korad™ film, available from PolyOne™ (Avon Lake, Ohio) at www.polyone.com/products/films/korad-weatherable-acrylic-films. Other acrylic films may be used. In alternative embodiments, canopy C may comprise a co-extruded acrylic surface. Canopy C is provided with a metal perimeter frame F having holes H at spaced locations along side elements of the frame F.

Figure 4:
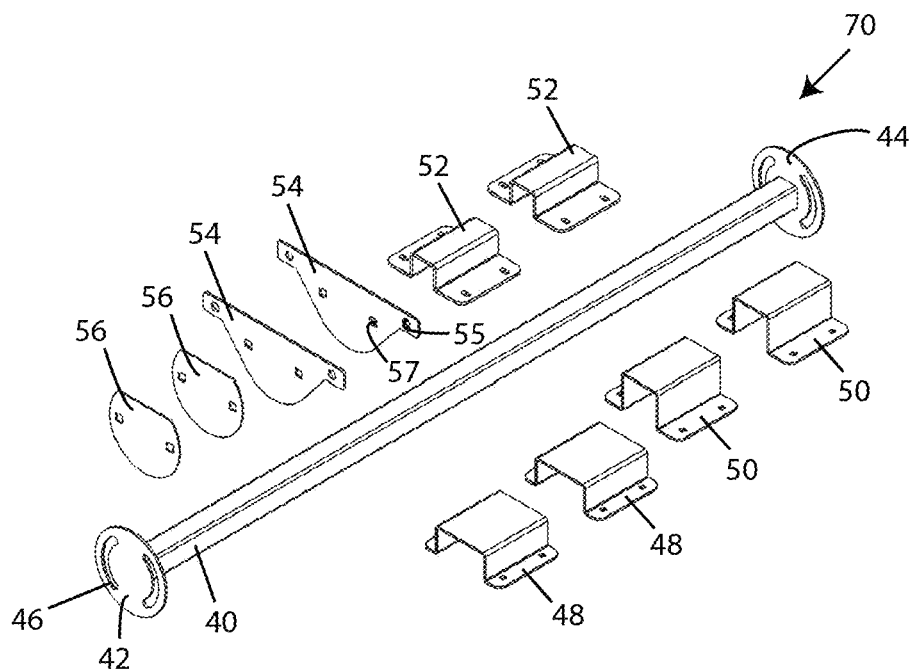
FIG. 4 is a disassembled view of a universal mounting system with varying sizes of clamps.

As seen in FIG. 4, one embodiment of mounting system 70 comprises a kit that includes a metal crossbar 40 with metal crossbar plates 42, 44 on opposing ends. Different ROPS models have bridging elements that vary in size (varying both in length and cross-sectional shape and area). To accommodate various bridging element sizes, the kit includes a plurality of ROPS clamp elements 48 and 50 having varied fixed sizes that are adapted to fit under bridging elements of a size and shape to securely fit the clamp elements. As shown in FIG. 4, ROPS clamps elements 48 and 50 vary in width for mounting onto a desired ROPS model. Crossbar clamp elements 52 are sized to fit the crossbar 40 and can be joined to the selected clamp element 48 or 50. In some embodiments, clamp elements may be adjustable instead of having a fixed size. The shape of the clamp element may also vary in other embodiments. Friction tape may be added to the inside of the rounded part of the clamp to aid in the claiming on the round cross section ROPS.

One or more clamps may be used to attach crossbar 40 onto a bridging element; for example, the two clamps of clamp element 50 shown in FIG. 3. Preferably, the crossbar 40 and crossbar clamp elements 52 have complementary cross sections (rectangular in the embodiments shown) that prevent rotation of the crossbar within the channel part of the clamp element 52. Similarly, since rectangular (or square) cross section ROPS are common, the cross section of the channels of ROPS clamp elements 48, 50 may be complementary rectangular (or square) shapes. Other shapes can be used.

Each of the clamp elements 48, 50, and 52 have outward-extending flanges so that a clamp element 52 can be joined to a clamp element 48 or 50 by passing bolts through aligned holes in the flanges and securing with nuts.

The kit includes offset plates 54 that are generally protractor-shaped with ears and have upper and lower holes 55 and 57. Plates 54 may be made of metal, such as steel. In installation of the canopy C, the plates 54 are secured to the frame F by bolts that pass through the upper holes 55 and into a selected hole H in the frame F. The lower holes 57, thus are offset below the frame F and the plates 42, 44 can be mounted to the offset plates by passing bolts through the curved slots 46 in the crossbar plates 42, 44 and the lower holes 57 and securing them with a nut. Preferably the nuts are serrated to prevent rotation once they are tightened.

Figure 5:
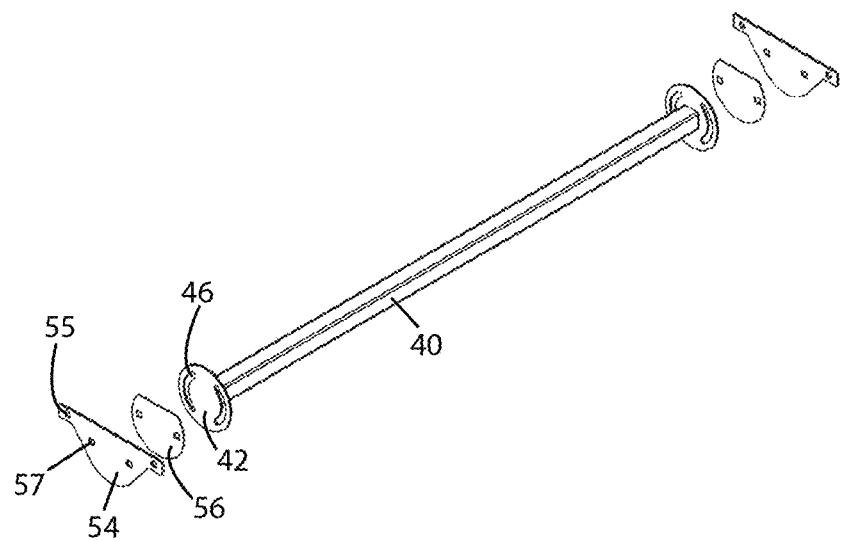
FIG. 5 is a perspective exploded view of parts of a universal mounting system adapted for installing a canopy onto a work vehicle.
Figure 6:
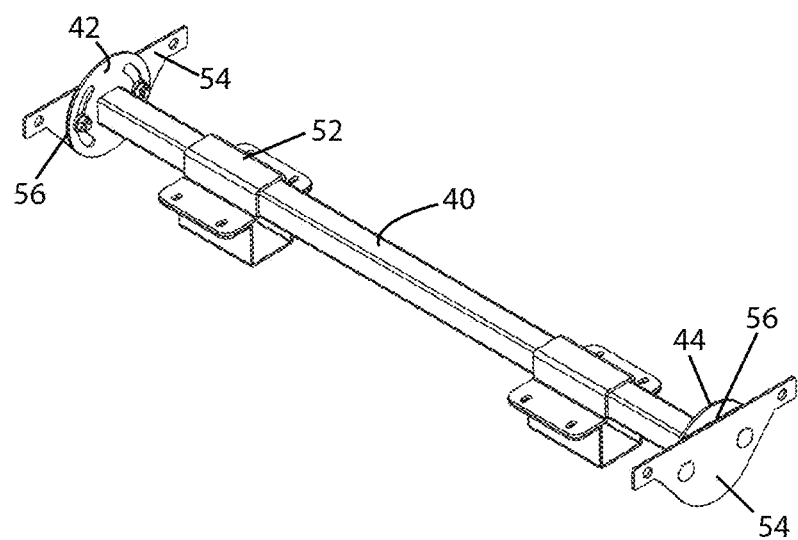
FIG. 6 is a perspective view of a partially assembled universal mounting system adapted for installing a canopy onto a work vehicle.

The kit can include friction sheets 56 that have holes that align with holes 57 when the sheets 56 are interposed between the crossbar plates and the offset plates. See FIG. 5. Sheets 56 are of a non-metal material such as PVC to add friction and cushioning between the plates. The sheets inhibit rotation of the plates with respect to one another.

The curved slots 46 of the crossbar plates subtend about 90 degrees of arc, so that the connection of the plates 42, 44 can be adjusted widely to be horizontal, even for tilted ROPs. The curved slots subtend a substantially greater angle than the curved slots of prior U.S. Pat. No. 10,053,159. The greater angle is enabled because the offset plates locate the holes that the plates 42, 44 mount to somewhat below the frame F, enabling the plates 42, 44 to have more space for the extended slots than was possible with the prior patent. The maximum pitch of the prior patent's plates was about 20-25 degrees, whereas ±45 degrees pitch is available using the structures disclosed herein, permitting mounting canopies on a greater range of ROPS.

Figure 7:
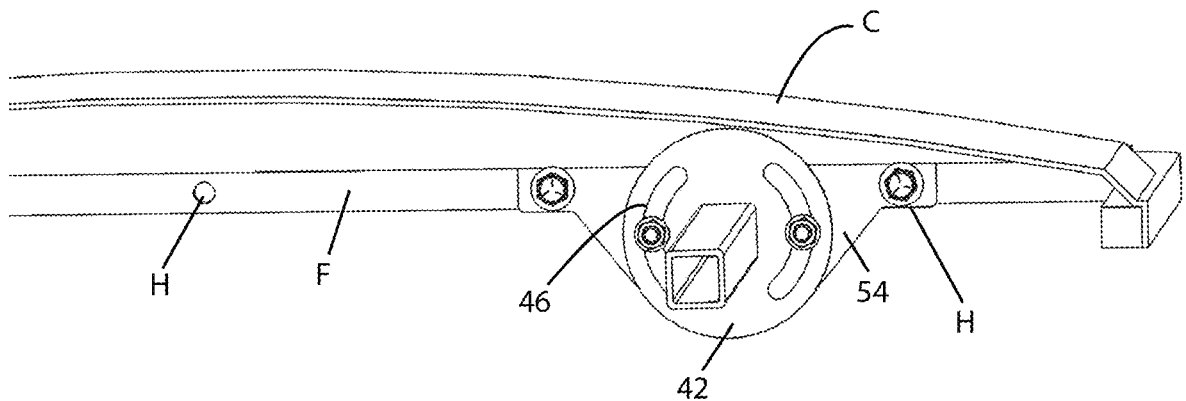
FIG. 7 is an enlarged sectional view of a canopy mounted with the universal mounting system and adjusted for a ROPS that is of rectangular cross section and that has a bridging element that is mounted so that it has vertical sides and a flat, horizontal top.
Figure 8:
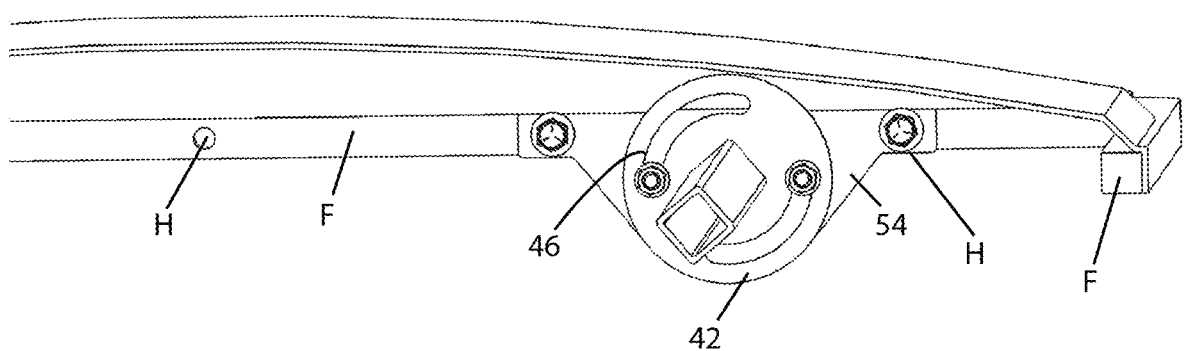
FIG. 8 is an enlarged sectional view of a canopy mounted with the universal mounting system and adjusted for a ROPS that is tilted forward, so its bridging element has two sloping upper sides.

FIGS. 7 and 8 show that the plates 42, 44 can be mounted on ROPS like those of FIGS. 1 and 2, respectively. In FIG. 7, the ROPS bridging element can be the element 20 shown in FIG. 1, so the clamps of the crossbar to the bridging element cause the crossbar 40 to have vertical sides and a horizontal top. In FIG. 8, the bridging element of the ROPS of FIG. 2 causes the crossbar to have tilted upper surfaces, like the tilted upper surfaces of the ROPS of FIG. 2. However, since the plates 42, 44 can be rotated before affixing to the offset plates 54, the resulting attitude (essentially horizontal) of the canopy C can be the same, as seen in FIGS. 7 and 8.

As seen in FIG. 7, to mount the canopy on a ROPS like the one shown in FIG. 1, the bolt is passed through the middle of the slot 46. In FIG. 8, the mounting to a ROPS like the one shown in FIG. 2 calls for the bolt to be passed through one end of the slot 46. If the ROPS tilts a reverse direction from the tilt of FIG. 2, the bolt can be passed through the other end of the slot 46. Intermediate slot locations for the bolt can be selected, to enable intermediate ROPS tilts to still yield a suitably horizontal canopy. The canopy can be mounted on a wide range of ROPS because the slot is provided to be as long as shown. The interposed friction sheet 56 helps prevent rotation of the canopy after installation.

In operation, the present invention may also be considered a method for installing a canopy onto a work vehicle ROPS, wherein the ROPS comprises roll bars having left and right downward extensions and a bridging element between the left and right downward extensions. For instance, a user may first clamp a mount having a crossbar with crossbar plates at opposing ends onto the bridging element. The clamp size may be selected according to the size of the bridging element to secure the mount. The canopy can be provided with offset plates on either side to provide mounting holes below a perimeter frame of the canopy.

Once the mount is secured onto the ROPS, the canopy is placed on top of the mount. The friction sheets can be inserted between the offset plates and crossbar plates. The holes in the offset plates are then aligned with a slot on each crossbar plate. The canopy is then connected to the crossbar plates by passing bolts through the holes in the offset plates and slots in the crossbar plates. The angle of the canopy is secured at a selected angle by tightening the bolts onto the offset plates.

Certain modifications and improvements will occur to those skilled in the art upon reading the foregoing description. By way of example, the canopy may be rotationally molded from plastics, such as polyethylene. It should be understood that all such modifications and improvements have been omitted for the sake of conciseness and readability, but are properly within the scope of the following claims.

What is claimed is:

1. A universal canopy for work vehicle ROPS (roll bars) that have left and right downward extensions and a bridging element between the left and right downward extensions comprising:
   a ROPS mount including a clamp to clamp to a ROPS, a crossbar attached to the clamp to extend laterally across the ROPS toward the left and right downward ROPS extensions, and crossbar plates on each opposed end of the crossbar, the crossbar plates in the crossbar having arcuate cutouts,
   a canopy with left and right depending peripheral flanges that have a plurality of holes arrayed in a fore-and-aft orientation, and
   offset plates having upper holes and lower holes, the offset plates being affixed through the upper holes of the offset plates to selected holes in the peripheral flanges in the canopy,
   whereby the ROPS mount can be clamped to a ROPS and the canopy can be bolted to the ROPS mount by passing bolts through the lower holes in the offset plates and one of the arcuate cutouts, and the canopy attitude can be adjusted to a desired orientation by positioning the bolts at a selected position in the arcuate cutouts.

2. The canopy as claimed in claim 1, wherein the arcuate cutouts in the crossbar plates subtend about 90 degrees.

3. The canopy as claimed in claim 1, wherein the canopy is formed of thermoformed plastic.

4. The canopy as claimed in claim 1 further including a coextruded acrylic layer coated on the canopy.

5. The canopy as claimed in claim 4, wherein the acrylic layer is an acrylic film.

6. The canopy as claimed in claim 1, wherein the clamp includes a ROPS clamp element with a channel to mate with a ROPS and flanges and a crossbar clamp element with a channel to mate with the crossbar, and both the ROPS clamp element and crossbar clamp element have flanges that can be positioned facing one another and held together to clamp the crossbar to the ROPS.

7. The canopy as claimed in claim 1, wherein the peripheral flanges of the canopy are in the form of an interior frame affixed to the canopy and the holes in the canopy are located on the interior frame.

8. The canopy as claimed in claim 1, wherein friction sheets are interposed between the offset plates and the crossbar plates.

9. A universal mount for installing a canopy onto work vehicle ROPS (roll bars) that have left and right downward extensions and a bridging element between the left and right downward extensions comprising:
   a clamp to secure the universal mount onto a ROPS,
   a crossbar attached to the clamp so the crossbar can be mounted to extend parallel to the bridging element, and
   crossbar plates on each opposed end of the crossbar, each crossbar plate having at least one slot adapted to receive a fastener,
   offset plates having upper holes and lower holes, the upper holes permitting affixation to a frame of a canopy, and the lower holes permitting affixation of the offset plates to a one of the crossbar plates through the slot in the crossbar plate,
   wherein the universal mount can be clamped to a ROPS and the canopy can be fastened to the offset plates and the universal mount by aligning holes on the offset plates with the slots in the crossbar plates and passing fasteners through the aligned holes and slots, and the canopy attitude can be adjusted to a desired orientation by positioning the fasteners at a selected position in the slots.

10. The universal mount as claimed in claim 9, wherein each crossbar plate has two opposing slots.

11. The universal mount as claimed in claim 9, wherein the slots subtend an angle of about 90 degrees.

12. The universal mount as claimed in claim 9, wherein the clamp attaches to the bridging element of the ROPS.

13. The universal mount as claimed in claim 9, wherein friction sheets are interposed between the offset plates and the crossbar plates.

14. A method for installing a canopy onto work vehicle ROPS (roll bars) that have left and right downward extensions and a bridging element between the left and right downward extensions comprising the steps of:
   clamping a mount having a crossbar with crossbar plates at opposing ends to the bridging element,
   affixing offset plates to a frame of a canopy by passing bolts through upper holes in the offset plates and into holes in the frame,
   aligning lower holes in the offset plates to a slot along each plate,
   passing bolts through the lower holes and slots,
   adjusting the angle of the canopy by positioning the bolts along the slots, and
   securing the canopy at the angle by fastening the bolts onto the offset plates.

15. The method for installing a canopy as claimed in claim 14, including interposing friction sheets between the offset plates and the crossbar plates.

16. A kit for installing a canopy onto a work vehicle ROPS (rollbars) comprising:
   a crossbar adapted to extend parallel to a bridging element of a ROPS;
   crossbar plates on each opposed end of the crossbar, each crossbar plate having at least one slot adapted to receive a fastener;
   a clamp including a ROPS clamp element having a channel sized and shaped to mate with the ROPS and a pair of flanges, a crossbar clamp element having a channel sized and shaped to mate with the crossbar and a pair of flanges, wherein the flanges of the ROPS clamp element and crossbar clamp element can be positioned facing one another and held together to clamp the crossbar to the ROPS;
   a canopy with left and right depending peripheral flanges that have a plurality of holes spaced apart in a fore-and-aft orientation; and offset plates having upper holes to permit affixation of the offset plate to the holes in the peripheral flanges of the canopy and lower holes to permit affixation of the offset plate to a slot in one of the crossbar plates.

17. A kit as claimed in claim 16 wherein the slots on the crossbar plates subtend an angle of about 90 degrees.

18. The kit as claimed in claim 16, also including friction sheets sized and shaped to be interposed between the offset plates and the crossbar plates.

\* \* \* \* \*